(12) United States Patent
Mitsch

(10) Patent No.: US 11,802,547 B2
(45) Date of Patent: Oct. 31, 2023

(54) BEARING STRUCTURE MADE OF ELASTOMER BEARING ELEMENTS WHICH CAN BE MOUNTED AND EXCHANGED INDIVIDUALLY

(71) Applicant: FM ENERGIE GMBH & CO. KG, Heppenheim (DE)

(72) Inventor: Franz Mitsch, Heppenheim (DE)

(73) Assignee: FM ENERGIE GMBH & CO. KG, Heppenheim (DE)

( * ) Notice: Subject to any disclaimer, the term of this patent is extended or adjusted under 35 U.S.C. 154(b) by 528 days.

(21) Appl. No.: 16/766,865

(22) PCT Filed: Dec. 4, 2018

(86) PCT No.: PCT/EP2018/000542
§ 371 (c)(1),
(2) Date: May 26, 2020

(87) PCT Pub. No.: WO2019/110138
PCT Pub. Date: Jun. 13, 2019

(65) Prior Publication Data
US 2020/0300328 A1 Sep. 24, 2020

(30) Foreign Application Priority Data
Dec. 8, 2017 (EP) .................................. 17002003

(51) Int. Cl.
*F03D 80/70* (2016.01)
*F03D 80/50* (2016.01)
(52) U.S. Cl.
CPC .............. *F03D 80/70* (2016.05); *F03D 80/50* (2016.05); *F16F 2228/007* (2013.01); *F16F 2230/46* (2013.01)

(58) Field of Classification Search
None
See application file for complete search history.

(56) References Cited

U.S. PATENT DOCUMENTS 8,991,800 B2 * 3/2015 Mitsch ...................... F16D 3/70
267/141.1

FOREIGN PATENT DOCUMENTS

| EP | 1593867 B1 * | 12/2008 | ............... F16D 3/70 |
| EP | 2821665 A2 * | 1/2015 | ............... F16D 3/70 |
| WO | 2010/054808 A1 | 5/2010 | |
| WO | WO-2010054808 A1 * | 5/2010 | ............... F16D 3/70 |
| WO | 2012/153197 A2 | 11/2012 | |
| WO | 2014/146763 A1 | 9/2014 | |

OTHER PUBLICATIONS

International Search Report Corresponding to PCT/EP2018/000542 dated Mar. 20, 2019.
Written Opinion Corresponding to PCT/EP2018/000542 dated Mar. 20, 2019.

* cited by examiner

*Primary Examiner* — Dirk Wright
(74) *Attorney, Agent, or Firm* — Finch & Maloney PLLC

(57) ABSTRACT

A bearing structure for large and heavy machines and systems, such as a wind turbine for example. In particular, the invention relates to such a bearing structure based on elastomer bearing elements, which can be mounted and exchanged individually without having to at least partly disassemble the bearing structure together with the system or machine. A method for simply exchanging elastomer elements in a bearing for heavy and large systems and machines.

23 Claims, 4 Drawing Sheets

BEARING STRUCTURE MADE OF ELASTOMER BEARING ELEMENTS WHICH CAN BE MOUNTED AND EXCHANGED INDIVIDUALLY

This application is a National Stage completion of PCT/EP2018/000542 filed Dec. 4, 2020, which claims priority from European patent application serial no. 17002003.6 filed Dec. 8, 2017.

FIELD OF THE INVENTION

The invention relates to a bearing structure for large and heavy machines and systems, such as a wind turbine for example. In particular, the invention relates to such a bearing structure based on elastomer bearing elements, which can be mounted and exchanged individually without having to at least partly disassemble the bearing structure together with the system or machine. The invention further relates to a method for simply exchanging elastomer elements in a bearing for heavy and large systems and machines.

BACKGROUND OF THE INVENTION

In large machines and systems, components of different sizes often have to be connected, and different acting forces and vibrations have to be compensated. This generally takes place using appropriate resilient bearings, which are attached between the components to be joined together.

This is the case for example for the resilient connection between the rotor shaft and the transmission, or else between the nacelle and tower of a wind turbine.

WO 2010/054808 discloses a resilient machine bearing or transmission bearing, in particular for use in a wind turbine, for transmitting the forces and moments that occur in all directions in space, in particular axially and radially, and for reducing and isolating occurring vibrations, this bearing comprising an axially oriented resilient sandwich element and a resilient cone element attached above or below, the axis of which is oriented perpendicular to the face of the sandwich element and the tapered end of which is positioned opposite this sandwich element (FIG. 1).

Therein, the construction is described in such a way that, when a resilient element, in particular a cone element, is exchanged because of wear, the parts for exchange can only be removed axially, which in turn means that this part of the system has to be tediously disassembled and subsequently reassembled. In spite of the known advantages of this bearing in terms of the vibration decoupling thereof, it can only be used at accessible points in the system or machine that allow disassembly of the system or parts thereof.

SUMMARY OF THE INVENTION

The object was thus to provide a bearing arrangement consisting of resilient elements that make it possible, through appropriate constructional measures, to exchange individual resilient bearing elements that are exposed to wear, without other parts of the bearing arrangement having to be uninstalled or significantly altered.

The object was achieved by the bearing arrangement presented and claimed herein.

The invention thus relates to a bearing construction consisting of individual resilient bearing elements for resiliently mounting machine or system parts, each resilient bearing element being individually mountable and exchangeable without disassembly and reassembly of the entire bearing construction or parts thereof.

In particular, the invention relates to a bearing arrangement of this type that has a plurality of resilient bearing elements, at least 3, preferably 12-72, the individual resilient bearings preferably being arranged and clamped annularly between two flanges. The flanges belong to two machine parts, which are thus to be interconnected in a resiliently bearing manner, for example a rotor shaft and a transmission block of a wind turbine.

The bearing construction or bearing arrangements according to the invention thus comprise a first flange (3) and a second flange (4), which are arranged against one another and clamped, via a plurality, at least three, preferably six or eight, of resilient bearings (1) attached between them, by clamping devices (5), in such a way that effective vibration damping or vibration and sound decoupling can occur as a result. According to the invention, the individual bearing elements (1) and the corresponding regions of the flange pieces (3) and (4) are configured in such a way that they can be uninstalled and replaced with new ones individually, without the whole arrangement having to be disassembled and reassembled after the exchange.

The invention thus relates to a bearing construction or bearing arrangement, resting on at least six 3 annularly arranged elastomer bearing elements, for resiliently bearing heavy machine parts, each elastomer bearing element being mountable and exchangeable individually without disassembly and reassembly of the entire bearing construction or parts of the associated machine, comprising three, four, six or more, preferably 12-72, resilient bearings (1), a first flange (3), which has an axial hole (10a) comprising an end-positioned internal thread (11), and a second, opposite flange (4) comprising one or more continuous holes (10c), each bearing (1) substantially being composed of a housing (1a), an inner, non-resilient core (1c), which has a hole (10b) centrally, and an actual elastomer part (1d) consisting of one or more elastomer layers, which are separated from one another by non-resilient layers, and the plurality of bearings (1) being arranged annularly between the two flanges (3)(4), and said flanges being clamped together by clamping means (5) via axial holes (10) in said individual components.

Preferably, said clamping means (5) comprise a screw bolt, which is passed at least through the hole (10c) in the flange (4) and the hole (10b) in the bearing (1) and can be screwed into the internal thread (11) at the end of the hole (10a) in the flange (3), clamping the bearing construction.

According to the invention, this bearing arrangement is in particular characterized in that (i) the second flange (4) has, on the face facing the bearing (1) or the first flange (3), a depression (7) or hollow, which is arranged concentrically with a hole (10c) and into which a correspondingly shaped part of the bearing (1)—either a part of the housing or a special adapter part (1b)—is inserted and fixed in an exact fit under bias in the operation-ready state of the bearing construction, the bearing (1), during disassembly of the bearing construction to exchange said bearing, being able to be slid out of said depression (7) into the space between the flanges (3) and (4) by increasing or decreasing the bias;

(ii) the face, facing the flange (4), or attached adapter part (1b) of each resilient bearing (1) fitting exactly in said depression (7) in the relevant region of the flange (4), at least the part of the hole (10b) in the bearing that is oriented toward the flange (4) being provided with a thread for receiving a mounting biasing bolt (13), by means of which the bearing (1) can be biased by sliding into the depression (7) during assembly, in the course of the exchange after removal of the clamping means (5), and optionally slid out again during disassembly; and (iii) at least one spacer disk (9), which is provided with a central hole and may consist of two spacer disk halves (9a) (9b), is introduced between each bearing (1) and the flange (3).

Said spacer disk should, expediently, have a coefficient of friction of the side faces thereof, against the adjacent faces of the bearing (1) and flange (3), that is high enough (preferably ≥0.3, in particular ≥0.4-0.6, depending on the thickness of the clamping bolt (5)) to prevent slippage during operation for the selected loads on the other parts.

The radial force transmission thus takes place by way of frictional fit of the spacer disk (9) for tightened clamping means (5). In this context, the coefficient of friction determines how great the frictional force is relative to the normal force; a higher coefficient of friction means a greater frictional force. The lower the frictional force between the spacer disk (9) and the adjacent faces on both sides, the more easily the bearing can slip if there are heavy loads at this point. This problem can be countered through the use of a clamping bolt (5) having a greater diameter and/or greater strength and higher bias. However, a better and surprising solution is the use according to the invention of a face, of the spacer disk (9) or of the disk halves thereof, that is curved spherically, concavely or convexly in one direction, as is shown in FIG. 7.

Preferably, both faces (16) of the spacer disk (9) are spherically curved to the same extent and in the same direction, the imaginary circle center point of the ball spheres being arranged axially and preferably in the direction of the resilient bearing (1) or the flange (4). For a bearing element of a wind turbine, the curvature of the two faces of the spacer disk (9) corresponds to a circle having a diameter of 30-100 cm, in particular 40-60 cm.

As a result of the curvature of the spacer disk (9), it is necessary also correspondingly to provide the adjacent faces with the same curvature, in such a way that in the operation-ready state the frictional forces can be optimally transmitted. Therefore, in this preferred embodiment, the resilient cone bearing (1C) thus likewise has a correspondingly curved, preferably spherically curved, base face toward the side of the spacer disk (9).

Likewise, in the same manner, in this case the flange (3) has a corresponding curvature in the contact region. This can be implemented directly on the flange (3), or else more simply by way of a support plate (19), which either is fixed to the flange or is located in a matching depression in the flange (3).

According to the invention, the spacer disk (9) is firmly clamped between the flange (3) and the bearing (1) in the operation-ready state of the bearing arrangement, and can, during disassembly of the bearing construction after the bias in the bearing (1) is reduced, be removed by removing the clamping means (5) by means of the mounting biasing bolt (13). Preferably, the spacer disk (9) is thicker than the depression (7) on the flange (4).

In a further embodiment of the invention, a corresponding bearing construction is proposed that provides an axially displaceable sleeve (8), which is preferably furnished with an internal thread, is located partly or completely in the axial hole (10a) in the flange (3), partly fills out each of the hole (10b) in the bearing (1) and the hole (10a) in the flange (3) in the operation-ready state of the bearing construction, and is of a length less than or equal to the length of the hole (10a), at least the part (10b') of the hole (10b) that is oriented toward the flange (3) having the same diameter as the hole (10a) in the flange (3) for receiving the displaceable sleeve (8). The sleeve (8) itself is firmly fixed in the operation-ready state by fixing means (12), for example a fixing screw in a longitudinal slit in the sleeve, and can, during disassembly of the bearing construction for exchanging the resilient bearing (1), be slid completely out of the resilient bearing (1) into the hole (10a) in the flange (3) by means of a mounting bolt (18). Generally, the sleeve can thus be slid back and forth in the space formed by the holes (10a) and (10b').

The use of an additional sleeve (8), as described, is expedient or even required if the space and the size ratios of the bearing arrangement or of individual regions are limited in such a way that the parts that have to absorb high forces (for example the clamping bolts (5)) cannot be provided sufficiently large or with sufficiently high strength.

However, if the clamping bolt (5) can be thick enough and the spacer disk (9) can have a sufficiently large friction area, the use of an additional sleeve provided with an internal thread can be dispensed with, especially since not only does this simplify the mounting and dismounting, but a corresponding, expanded configuration in the form of different hole diameters (10b) (10b') of the non-resilient core (1c) can also be omitted.

Conversely, when a slidable sleeve is used, no special requirements or limitations have to be placed on the frictional force or the required coefficients of friction.

The holes, which pass at least through the components (4), (1) and (9) and end in the flange (3), are furnished with different or identical diameters depending on the function thereof and the components guided therein, so as to be able to guide clamping means (5) and/or mounting means (13) (18) of different thicknesses therein.

Thus, in most possible embodiments of the invention, the hole (10c) in the flange (4) is larger than the holes (10a) in the flange (3) and (10b) in the bearing (1).

Further, the diameter of the part of the hole (10b) in the resilient bearing (1) that is furnished with the internal thread is generally less than the diameter of the part of the hole (10b') in the same bearing if a displaceable sleeve (8) is used. In this case, the hole (10a) in the flange (3) and the hole (10b') in the resilient bearing (1) should be of the same diameter, which corresponds to the external diameter of the sleeve (8). Further, in this case the length of the hole (10b') should be selected in such a way that it can receive at least part, preferably half, of the length of the sleeve (8) by displacement, while the other half fills out part of the space in the hole (10a) in the flange (3). The hole (10a) in the flange (3) should be at least long enough that it can completely receive the sleeve (8), this being necessary when the resilient bearing (1) is being mounted and dismounted.

Generally, any construction type of a resilient bearing (1) can be used between the flanges (3) and (4). In a preferred embodiment of the invention, however, a resilient cone bearing is used. In this case, the resilient layers, which are separated by non-resilient intermediate layers, are arranged so as to take on a cone shape having a central axis coincident with the axis of the bearing or of the holes (10). The cone can thus open both toward the flange (3) and toward the flange (4), preferably opening toward the flange (3), in particular if a further resilient element (2) is attached on the other outward-facing side of the flange (4).

In a preferred embodiment of the invention, the bearing construction comprises both the resilient bearings (1) constructed in accordance with the invention, which are formed as cone elements (1A) having a preferably open cone toward the flange (3), and a further resilient bearing (2), which is formed as a sandwich element (2A) and is attached opposite on the outside of the flange (4). The sandwich element (2A) and cone element (1A) are preferably interconnected via a spacer sleeve (6), which is inserted into the hole (10c) in the flange (4).

This double bearing, which is known in principle from WO 2010/054808 but without the features according to the invention set out herein as regards exchangeability and simplified mountability, has excellent properties in damping vibrations, in particular flexural vibrations, in heavy machines, in particular wind turbines, in which complete disassembly of relevant components is generally particularly difficult, or sometimes even impossible, as a result of the size, weight and location.

By way of this double bearing, the invention and the use thereof are to be described more precisely in following.

BRIEF DESCRIPTION OF THE DRAWINGS

FIGS. 1(a) and 1(b) show a rotor-transmission connection of a prior art wind turbine while FIG. 1(c) shows possible arrangements of flange connections in prior art wind turbines.

DETAIL DESCRIPTION OF THE PREFERRED EMBODIMENTS

Figure 1:
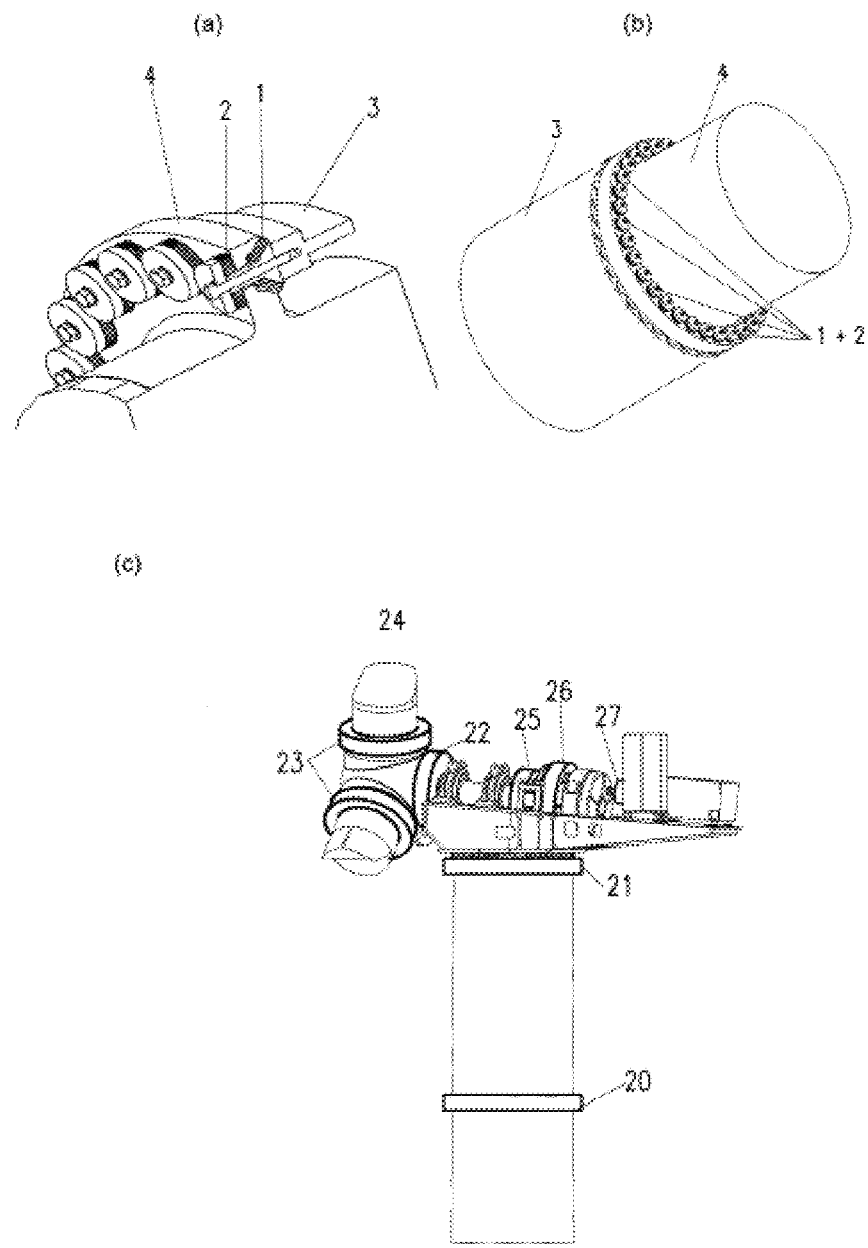

FIGS. 1(a) and 1(b) show a rotor-transmission connection of a prior art wind turbine. Herein, numerous bearing units are arranged around the rotor shaft of a wind turbine. Each bearing unit consists of a flat, resilient sandwich bearing element and a resilient cone bearing element, the cone elements being arranged between the two different machine parts.

FIG. 1(c) shows possible arrangements of flange connections in prior art wind turbines.

Figure 2:
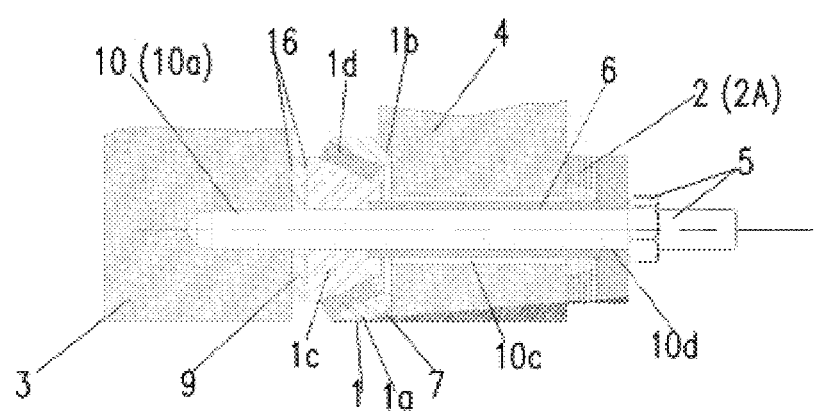
FIG. 2 shows one of many double bearing elements of the bearing element according to the invention in the operation-ready state.

FIG. 2 shows one of many double bearing elements of the bearing element according to the invention in the operation-ready state, consisting of a resilient sandwich element (2) (2A) external to the flange (4) and a resilient cone element (1) (1A) between the flange (4) and the flange (3), which are interconnected via the spacer sleeve (6), which is passed through the hole (10c) while ensuring sufficient play for the movement in the hole. The cone element has a non-resilient core (1c), which here has an internal thread, for receiving the mounting biasing screw (13). Part of the base face of the bearing element (1) that faces the flange (4) thus sits in a matching depression (7) in the flange (4), from which it can easily be pulled out or removed during disassembly after the bias of the element is reduced.

Between the cone element and the flange (3), there is a spacer disk (9), which may also consist of two disk halves, for better guidance into the gap, in particular if a bolt is present in the hole (10) in the bearing arrangement. The spacer disk has friction areas (16) opposite the inner face of the flange (3) and the other base face of the cone element. These friction areas are intended to prevent slipping, and thus destabilization of the bearing, from occurring in the biased state when bending forces on the bearing arrangement occur.

The double bearing is biased by the biasing bolt (5), which has to be dimensioned in thickness in such a way that it withstands forces acting primarily on said bolt and passes them on to components in contact therewith. The diameter of the bolt (5) is thus smaller than the hole (10b) in the internal thread of the cone element (1)(1A), in such a way that said bolt can be pushed through said hole and, as shown, can be screwed to the internal thread (11) of the hole (10a) in the flange (3). The hole (10a) in the flange (3) may also pass completely through the component, and screwing may also alternatively take place by way of a nut on the outer face of the flange (3).

Figure 3:
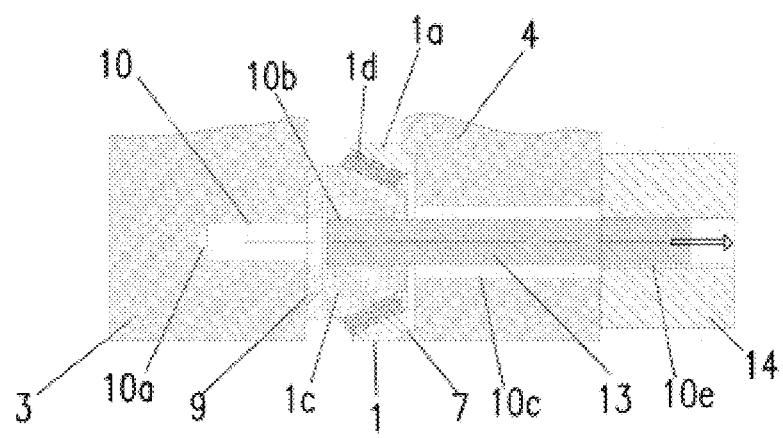
FIG. 3 shows the double bearing element, as set out in FIG. 2 and described above, but without the biasing bolt (5).

FIG. 3 shows the double bearing element, as set out in FIG. 2 and described above, but without the biasing bolt (5). Instead, in the relevant holes (10c) and (10b), there is a mounting biasing screw (13), which is screwed to the internal thread of the cone element (1A), in such a way that said element can be pulled using a mechanical or hydraulic pulling device (14) by applying the force (15) axially toward the flange (4). As a result, the conically arranged elastomer layers (1d) of the bearing (1) are compressed, increasing or forming a bias. As a result, a gap is produced between the cone element and the spacer disk (9) or the two disk halves thereof, and makes it possible to pull out the spacer disk.

Figure 4:
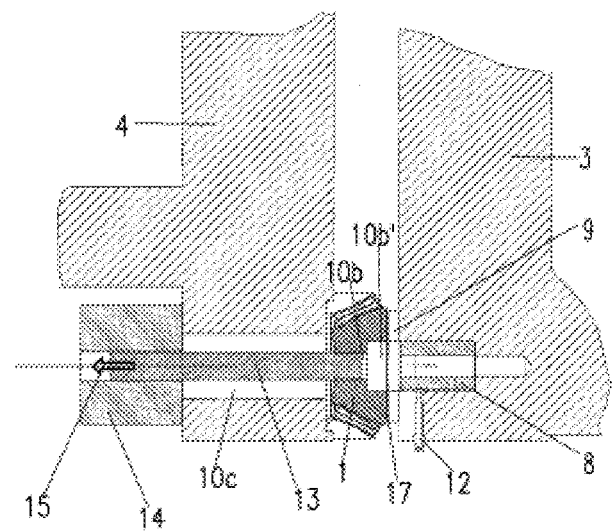
FIG. 4 shows the double bearing element, as described above, but in a different embodiment using a slidable sleeve (8).

FIG. 4 shows the double bearing element, as described above, but in a different embodiment using a slidable sleeve (8). As described previously, this embodiment is applied if the frictional forces of the spacer disk (9) against the bordering faces is not sufficient. In this view, the sleeve (8) is located completely in the hole (10a) in the flange (3). The sleeve has an internal thread. The cone bearing (1A) has, in the core (1c), a hole (10b'), which is arranged opposite the flange (3) and which substantially corresponds in diameter to the hole (10a). Toward the flange (4), the bearing (1) has the hole (10b) at a preferably smaller diameter. The hole (10b) is provided with an internal thread for receiving the mounting biasing screw (13), also shown, which can be pulled in the direction of the arrow using an axial force (15) generated by a hydraulic or mechanical pulling device (14).

Figure 5:
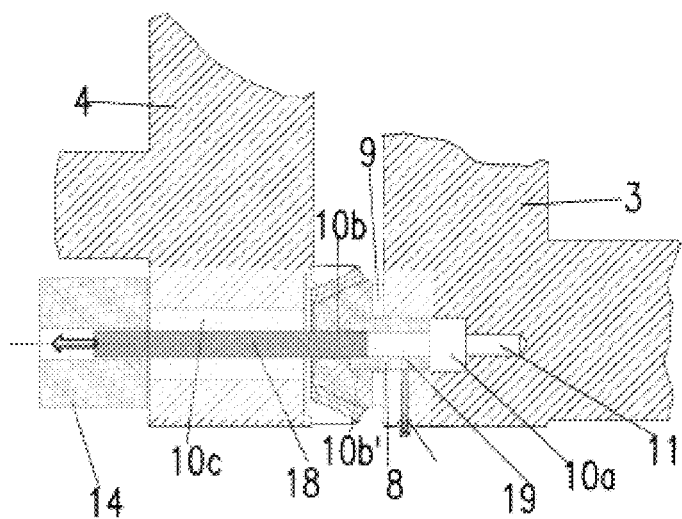
FIG. 5 shows the same construction as FIG. 4, but after displacement of the sleeve (8), by the mounting screw (18) connected to the internal thread thereof, into the provided space in the hole (10b') in the resilient bearing (1).

FIG. 5 shows the same construction as FIG. 4, but after displacement of the sleeve (8), by the mounting screw (18) connected to the internal thread thereof, into the provided space in the hole (10b') in the resilient bearing (1). In this context, the sleeve is locked on the flange (3) by means of a fixing bolt (12).

Figure 6:
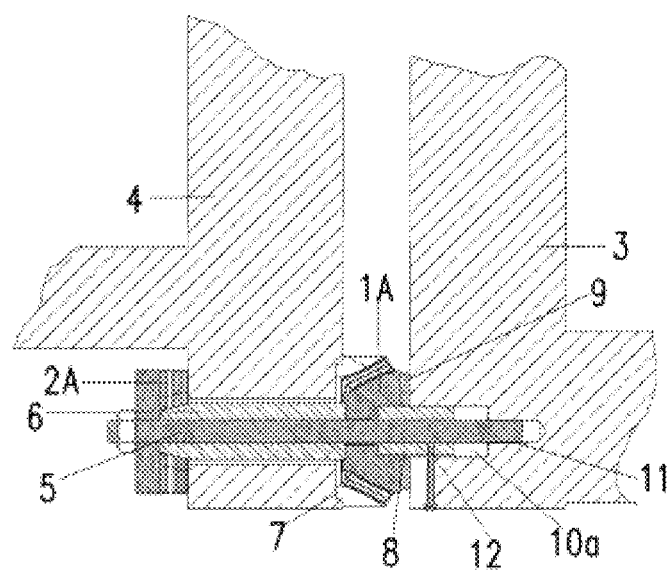
FIG. 6 shows the arrangement of FIG. 5, after removal of the pulling device (14) and mounting of the sandwich element (2A), the spacer disk (6) and the biasing bolt (5), which is screwed to the thread (11) of the hole (10a) in the flange (3).

FIG. 6 shows the arrangement of FIG. 5, after removal of the pulling device (14) and mounting of the sandwich element (2A), the spacer disk (6) and the biasing bolt (5), which is screwed to the thread (11) of the hole (10a) in the flange (3). In this state, the double bearing is operation-ready. The exchange of individual elastomer bearing elements from a bearing construction, comprising a plurality of elastomer bearing elements, of a system or machine is performed as follows.

Figure 7:
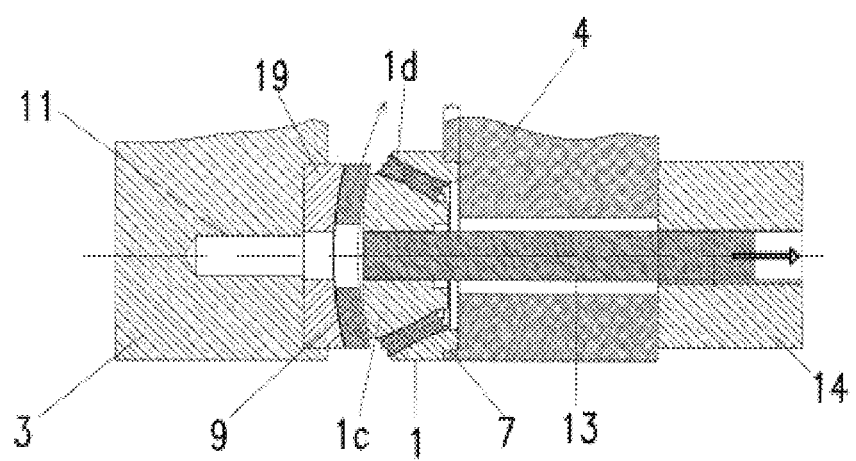
FIG. 7 shows a bearing arrangement corresponding to FIG. 3.

FIG. 7 shows a bearing arrangement corresponding to FIG. 3.

In contrast, however, the spacer disk (9) has a curved shape oriented spherically toward the cone bearing (1A). The base face of the cone bearing that is positioned opposite the spacer disk (9) has the same shape, and so the two faces exactly match one another.

In the embodiment shown, the spherically curved spacer disk also bears on a corresponding shaped, matching support plate (19). The support plate may, as shown, be mounted and fixed in a corresponding depression in the flange (3), but may also simply be screwed or otherwise fixed to the flange face. As a result of this constructional measure, the frictional force can be further increased, in such a way that in the operation-ready state the clamping bolt (5) does not have to be dimensioned as thick and strong.

In the following, the method of dismounting and mounting resilient elements in a bearing arrangement according to the invention is described in greater detail:

Dismounting in embodiments without a slidable sleeve:

Initially, the clamping screw (5) is unscrewed from the internal thread (11) in the flange (3) and pulled out of the axial holes (10a-c) in the relevant components (FIG. 2). The spacer sleeve (6) and sandwich bearing (2A) can thus be removed. Since the bearing element is only one of many in the overall bearing construction, the local contact pressure is still high enough that the spacer disk cannot be removed. The cone element (1A) is fixed in the depression (7) in any case.

According to FIG. 3, a mounting biasing bolt (13) provided with a thread is now screwed into the internal thread of the hole (10b) in the bearing (1) from the side of the flange (4). Subsequently, the bolt (13) is connected to a hydraulic or mechanical pulling device, which pulls the bolt and thus also the connected resilient cone bearing (1A) axially toward the flange (4) with a tensile force (15). As a result, the conically arranged elastomer layers (1d) of the bearing (1) are compressed and the core (1c) is axially displaced slightly toward the flange (4). This results in a gap (17) that is sufficient for pulling the spacer disk (9) or the disk halves thereof out of the space between the flange (3) and the flange (4). This is followed by removing the bolt (13) by undoing the bias of the elastomer bearing (1), in such a way that said bearing can be removed from the depression (7) and subsequently from the flange opening.

To achieve this, the spacer disk (9) has to be thicker than the depth of the depression (7), including the bias of the resilient element (1d). Specifically, for removing the spacer disk 9, the resilient element (1d) has to be biased more than it already is in the installed state. If the removed disk (9) were not thicker than the depression (7), including the total bias extent of the elastomer part (1d), it would not be possible to remove the entire resilient element (1) radially between the flanges (3) and (4).

Dismounting in embodiments with a slidable sleeve:

The initial situation in this case is illustrated well by FIG. 6. Initially, in this case too, the clamping bolt (5), the layer bearing (2A) and the spacer disk (6) are removed.

Next, the spacer disk (9) has to be loosened and removed. This is done by compressing the conical, resilient layers (1d), causing the solid core (1c) to be displaced axially toward the flange (4) and a gap (17) to appear between the resilient bearing (1) and the spacer disk. There are two options for this.

For the first option, the cone bearing is compressed by way of the mounting biasing screw (13), which is screwed into the bearing (1) and pulled toward the flange (4) by the aforementioned pulling devices (14) (FIG. 4).

Since the sleeve (8) reaches into part of the hole (10b) in the cone element (1A), where it fills up the space in the hole (10b') and is locked by the fixing means (12), the aforementioned sleeve next has to be slid completely out of the cone element (1) into the flange (3) or into the hole (10a) provided therein. This is done by releasing the locking (12), inserting and screwing a mounting bolt (18) to the sleeve (8) provided with an internal thread from the side of the flange (4) via the holes (10c), releasing the fixing means (12), and completely displacing the sleeve (8) from the resilient bearing (1) into the hole space (10a) in the flange (3).

Subsequently, by means of the mounting bolt 13, the conical layer (1d) is biased to such an extent that the spacer disk (9) is freed. The spacer disk (9) is thus freed and can be removed. Displacement of the sleeve (8) may be superfluous if the spacer disk (9) is present in two halves.

For the second option, the cone layer is compressed by way of a mounting bolt (18), which is screwed into the internal thread of the sleeve (8) and, after the locking of the sleeve (8) is undone, pulled toward the flange (4) by the aforementioned pulling device (14). This alternative can only be applied if the spacer disk is present in two halves, since the sleeve remains substantially at the original position thereof (in the hole (10b') and the hole (10a)).

Before the resilient bearing (1) and the spacer disk (8) are removed, the sleeve (8) is completely slid into the hole (10a) in the flange (3).

This is followed by the following mounting steps:

A new, correspondingly configured resilient bearing (1), which is to replace the old one, is inserted into the space between the flanges (3) and (4), and the mounting biasing bolt (13), which is guided in the flange (4) from the outside via the hole (10c), is screwed to the internal thread of the hole (10b) in the resilient bearing (1). By means of a mounting pulling device (14), which exerts an axially outwardly acting tensile force on the mounting biasing bolt (13) and thus on the resilient bearing (1), The resilient bearing (1) is thus pulled into the depression (7) in the flange (4), additionally causing said bearing to attain a bias and more space to appear between the flange parts (3)(4). It is thus possible to slide the spacer disk (9) or the halves (9a)(9b) thereof into the resulting gap between the resiliently biased bearing (1) and the flange (3) in such a way that the central hole of said disk is coincident with the holes (10a) in the flange (3) and (10b) in the resilient bearing (1).

After the mounting biasing bolt (13) is removed, the resulting reduction in the bias of the resilient bearing (1) causes the spacer disk (9) to be firmly gripped between the flange (3) and the resilient bearing (1).

If a slidable sleeve (8) is used, it is connected via the internal thread thereof to a mounting bolt (18), via the holes (10c) (10b) (10b'), the sleeve initially being located in the hole (10a) in the flange (3). Once the spacer disk (9) has been slid in and positioned, as described above, the sleeve (8) is slid into the hole (10b') in the resilient bearing (1) and locked on the flange (3) by a fixing means (12). Subsequently, the mounting bolt (18) is removed.

Finally, the construction is screwed and biased by means of the clamping bolt (5), with the spacer disk (6) having been brought into the hole (10c) in the flange (4) and the sandwich bearing element (2A) having been added to the outside of the flange (4) in advance.

REFERENCE NUMERALS (1) Resilient bearing element between flanges (3) and (4)
  (1a) Housing of bearing element
  (1b) Adapter part
  (1c) Non-resilient core comprising hole (10b) (10b')
  (1d) Elastomer part
(1A) Resilient cone element
(2) Resilient bearing element on outside of flange (4)
(2A) Resilient sandwich element
(3) First flange—comprising hole (10a) for receiving sleeve (8), and end-positioned threaded hole (11)
(4) Second flange—comprising hole (10a)
(5) Clamping means/threaded bolts
(6) Spacer disk for hole (10c)
(7) Depression on inside of flange (3) for receiving adapter part (1b)
(8) Slidable sleeve
(9) Spacer disk between resilient bearing element (1) and flange (3) comprising central hole
  (9a) Spacer disk half
  (9b) Spacer disk half
(10) Holes continuing into one another in (1) (2) (3) (4)
  (10a) Hole in flange (3) for receiving sleeve (8) during mounting
  (10a') Internal diameter of internal thread of sleeve (8)
  (10b) Hole in bearing (1), on flange (4) side, comprising internal thread for screwing to mounting biasing bolt (13)
  (10b') If sleeve (8) is used: hole in bearing (1) on flange (3) side, for receiving part of sleeve (8) in operation-ready state
  (10c) Hole in flange (4)
  (10d) Hole in resilient bearing (2)
  (10e) Hole in mounting pull element (14)
(11) Internal thread at end of hole (10a) in flange (3) for screwing to biasing means/biasing screw (5)
(12) Fixing means for sliding sleeve (8) perpendicular to hole (10) (10a)
(13) Mounting biasing bolt comprising thread for screwing to bearing (1)
(14) Mounting pull element (for example pull cylinder) for pulling mounting biasing bolt (13) out of flange (4) while simultaneously sliding in the bearing (1) fastened to the screw (13)
(15) Tensile force on mounting means (13) or (18)
(16) Friction areas of spacer disk
(17) Gap between face, on flange (3) side, of resilient bearing (1) and spacer disk (9) or disk halves thereof
(18) Mounting bolt (for example comprising thread) for fastening and guiding sleeve (8)
(19) Support plate between spacer disk (9) and flange (3) for bearing the spacer disk
20 Tower decoupling mechanism
21 Top of tower decoupling mechanism
22 Rotor hub decoupling mechanism
23 Blade attachment decoupling mechanism
24 Blade partition decoupling mechanism, round or adapted to blade shape
25 Rotor shaft decoupling mechanism
26 Ring gear planetary transmission decoupling mechanism
27 Generator—shaft decoupling mechanism

The invention claimed is:

1. A bearing construction, based on at least three to six annularly arranged elastomer bearing elements, for resiliently bearing heavy machine parts, each elastomer bearing element being mountable and exchangeable individually without disassembly and reassembly of an entire bearing construction or parts of the associated machine, comprising three to six or more resilient bearings (1), a first flange (3), which has an axial hole (10a), and an opposite second flange (4) comprising one or more continuous holes (10c), each bearing (1) substantially comprising:
  a housing (1a), an inner, non-resilient core (1c), which has a hole (10b) centrally, and
  an elastomer part (1d) comprising one or more elastomer layers, which are separated from one another by non-resilient layers,
  the bearings (1) being arranged between the first and the second flanges (3, 4), and the first and the second flanges being clamped together by clamping means (5) via the axial holes (10) in said bearing and the first, and the second flanges,
wherein
  (i) the second flange (4) has, on a face facing the bearing (1) or the first flange (3), a depression (7), which is arranged concentrically with the hole (10c) of the second flange and into which a correspondingly shaped part of the bearing (1) is inserted and fixed in an exact fit under bias in an operation-ready state of the bearing construction, the bearing (1), during disassembly of the bearing construction to exchange said bearing, being able to be slid out of said depression (7) into a space between the first and the second flanges (3, 4) by increasing or decreasing a bias;
  (ii) each of the resilient bearings has a first face, facing the second flange (4), or attached adapter part (1b) that fits exactly in said depression (7) in the second flange (4), at least part of the hole (10b) of the bearing that is oriented toward the second flange (4) being provided with a thread for receiving a mounting biasing bolt (13), by which the bearing (1) can be biased by sliding into the depression (7) during assembly, in a course of exchange after removal of the clamping means (5); and
  (iii) at least one spacer disk (9), which is provided with a central hole and may comprise two spacer disk halves (9a, 9b) and which is firmly clamped between the first flange (3) and the respective resilient bearing (1) in an operation-ready state of the bearing construction and which can be removed, during disassembly of the bearing construction, after removal of the clamping means (5), by reducing the bias in the bearing (1) by the mounting biasing bolt (13), is introduced between each of the resilient bearings (1) and the first flange (3).

2. The bearing construction according to claim 1, wherein the spacer disk (9) has a coefficient of friction on side faces thereof, against an adjacent second face of the bearing (1) and an adjacent face of the first flange (3), of ≥0.4.

3. The bearing construction according to claim 1, wherein the spacer disk (9) has a spherical, concave or convex curvature, just as the second face of the resilient bearing (1) that is positioned fitting against the spacer disk (9) in the operation-ready state does in this case.

4. The bearing construction according to claim 3, wherein the spherically, concavely or convexly curved spacer disk (9) is mounted, on the flange side, on a correspondingly shaped support plate (19) or a support face on the first flange (3) or in a correspondingly shaped depression in the first flange (3).

5. The bearing construction according claim 1, wherein the spacer disk (9) is thicker than the depression (7), including an extent of the bias of the elastomer part (1d).

6. The bearing construction according to claim 1, wherein the axial hole (10a) in the first flange (3) is provided for completely or partly receiving an axially displaceable sleeve (8), which partly fills up each of the hole (10b) in the bearing (1) and the hole (10a) in the first flange (3) in the operation-ready state of the bearing construction and which is of a length less than or equal to the hole (10a) of the first flange, at least a part (10b') of the hole (10b) of the bearing that is oriented toward the first flange (3) having the same diameter as the hole (10a) in the first flange (3) for receiving the displaceable sleeve (8), which is fixed in place by fixing means (12), and being able to be slid completely out of the resilient bearing (1) into the hole (10a) in the first flange (3) by means of a mounting bolt (18) during disassembly of the bearing construction for replacing the resilient bearing (1).

7. The bearing construction according to claim 1, wherein said clamping means (5) comprise a threaded bolt, which is passed at least through the hole (10c) in the second flange (4) and the hole (10b) in the bearing (1) and can be screwed to the flange (3), clamping the bearing construction.

8. The bearing construction according to claim 1, wherein the axial holes (10a, 10b, 10c), which pass through the first, the second flanges (3, 4) and the resilient bearing (1) located between them, are furnished with different or identical diameters depending on a function thereof and components guided therein, so as to guide the clamping means (5) and/or mounting means (13, 18) of different or identical thicknesses therein.

9. The bearing construction according to claim 8, wherein the hole (10c) in the second flange (4) is larger than the holes (10a) in the first flange (3, 10b) in the bearing (1).

10. The bearing construction according to claim 8, wherein, in the resilient bearing (1), the diameter of the part of the hole (10b) furnished with the internal thread is less than the diameter of a part of the hole (10b') in which part of a sleeve (8) is located in the operation-ready state of the bearing construction.

11. The bearing construction according to claim 6, wherein the sleeve (8) has an internal thread, into which a mounting bolt (18) can be screwed in the course of exchanging the resilient bearing (1) after the removal of the clamping means (5), in such a way that the sleeve can be slid back and forth in the space formed by the hole (10a, 10b') in the first flange and the part (10b') of the hole (10b) of the bearing oriented toward the first flange.

12. The bearing construction according to claim 11, wherein an internal diameter (10a') of the sleeve (8) is less than the diameter of the the part (10b') of the hole in the bearing (1).

13. The bearing construction according to claim 6, wherein the sleeve (8) can be fixed in the axial movement thereof by the fixing means (12) applied radially in the hole (10a) of the first flange.

14. The bearing construction according claim 1, wherein the hole (10c) of the second flange has a spacer disk (6), a length of which corresponds to a thickness of the first flange (3).

15. The bearing construction according to claim 1, wherein the bearing construction has, for the mounting during a course of exchanging the resilient bearing (1), a pulling device (14), which comprises a hole (10e) that is connected to the hole (10c) in the second flange (4) and that is applied opposite the bearing (1) on an opposite side of the second flange (4) and that serves to press the mounting biasing bolt (13) into the depression (7) in the second flange (4) by tensile force, so as to give the bearing (1) to be mounted a bias, and to provide sufficient space for introducing the spacer disk (9) or the half disks thereof between the bearing (1) and the first flange (3), and said pulling device (14) being removed again after successful exchange of the bearing.

16. The bearing construction according to claim 1, wherein the axial hole (10a) in the first flange (3) is provided with an end-positioned internal thread (11).

17. The bearing construction according to claim 1, wherein the resilient bearing (1) is a cone bearing (1A).

18. The bearing construction according to claim 1, wherein, in the operation-ready state, the bearing construction has a second resilient bearing (2), which is applied against the resilient bearing (1) via the hole (10c) in the flange (4) and which, by the clamping screw (5) that is passed through a hole (10d) in a sandwich element and can be screwed to an end-positioned internal thread (11) in the first flange (3), can be clamped against the first and the second flanges (3, 4) together with the resilient bearing (1).

19. The bearing construction according to claim 18, wherein the second resilient bearing (2) is a sandwich bearing (2A).

20. The bearing construction according to claim 1, wherein the bearing construction comprises 3, 4 or between 6-72 combination bearings consisting of a resilient bearing (1) and a resilient second bearing (2), and the resilient bearing (1) being a cone bearing (1A) and the resilient second bearing (2) being a sandwich bearing (2A).

21. A wind turbine, wherein the wind turbine comprises a bearing construction according to claim 1.

22. A method for exchanging individual elastomer bearing elements from a bearing construction, comprising a plurality of elastomer bearing elements, of a system or machine without disassembling and reassembling an entire bearing construction or parts of the associated machine, wherein a bearing construction according to claim 1 is used, and the following disassembly steps are carried out:
  (ai) unscrewing the clamping screw (5) from the internal thread (11) in the first flange (3) and pulling the clamping screw (5) out of the holes (10a, 10b, 10c) in the bearing and the first, and the second flanges;
  (aii) removing a spacer sleeve (6) and, if applicable, a resilient second bearing (2);
  (aiii) if a slidable sleeve (8) is being used: screwing a mounting bolt (18) to the sleeve (8), which is provided with an internal thread and part of which fills out the hole (10b') in the resilient bearing (1), from the side of the second flange (4) via the holes (10c), of the second flange, releasing a fixing means (12), and completely displacing the sleeve (8) out of the resilient bearing (1) in the hole (10a) in the second flange (4);
  (aiv) screwing a mounting biasing bolt (13) provided with a thread into the internal thread of the hole (10b) in the bearing (1),
  or alternatively, if the sleeve (8) is present: screwing a mounting bolt (18) provided with a thread into the internal thread of the sleeve (8),
  and exerting a tensile force (15) on the relevant mounting bolt by a mounting pulling device (14) while simultaneously increasing a bias of the elastomer part (1d) of the bearing (1), causing a seat of the spacer disk (9) to be loosened;
  (av) removing the spacer disk (9) or, if applicable, the disk halves thereof and the mounting biasing bolt (13), and (avi) subsequently removing the relevant mounting bolt and then taking the resilient bearing (1) to be exchanged out of the depression (7) in the second flange and removing the bearing from the space between the first and the second flanges (3, 4).

23. A method according to claim 19, wherein the following mounting steps are carried out:
 (bi) inserting a new, correspondingly configured resilient bearing (1) into the space between the first and the second flanges (3, 4), and screwing the mounting biasing bolt (13), which is guided in the second flange (4) from the outside via the hole (10*c*) of the first flange, to the internal thread of the hole (10*b*) in the resilient bearing (1);
 (bii) inserting the resilient bearing (1) into the depression (7) in the second flange (4) by a mounting pulling device (14), which exerts an axially outwardly acting tensile force (15) on the mounting biasing bolt (13) and thus on the resilient bearing (1), causing the resilient bearing (1) to attain a bias between the first and the second flanges (3, 4) with a gain in space;
 (biii) sliding the spacer disk (9) or the halves (9*a*, 9*b*) thereof into a resulting gap between the resiliently biased bearing (1) and the first flange (3) in such a way that the central hole of said spacer disk is coincident with the holes (10a) in the first flange (3, 10b) and in the resilient bearing (1);
 (biv) removing the mounting biasing bolt (13), the reduction in the bias of the resilient bearing (1) causing said bearing and the spacer disk (9) to be firmly gripped between the first and the second flanges (3, 4);
 (bv) if a slidable sleeve (8) is used: connecting a mounting bolt (18) via the holes (10*c*, 10*b*, 10*b'*) in the second flange and the bearing to the sleeve (8), which is provided with an internal thread and which is located in the hole (10*a*) in the first flange (3), pulling said sleeve (8) into the hole (10*b'*) in the resilient bearing (1), and locking the sleeve (8) on the first flange (3) using a fixing means (12) and removing the mounting bolt (18); and
 (bvi) screwing and clamping the bearing construction by the clamping means (5), with the spacer disk (6) having been brought into the hole (10*c*) in the second flange (4) and/or a second resilient bearing element (2) having been added to the second flange (4) in advance.

* * * * *